US011807762B2

(12) United States Patent
Mougin et al.

(10) Patent No.: US 11,807,762 B2
(45) Date of Patent: Nov. 7, 2023

(54) PROCESS FOR PREPARING AQUEOUS GEL INKS WITH VARIABLE COLOR, AND AQUEOUS GEL INKS THEREOF

(71) Applicants: SOCIETE BIC, Clichy (FR); UNIVERSITE DE HAUTE ALSACE, Mulhouse (FR); CENTRE NATIONAL DE LA RECHERCHE SCIENTIFIQUE (C.N.R.S.), Paris (FR)

(72) Inventors: Karine Mougin, Valdieu-Lutran (FR); Feriel Ghellal, Belfort (FR); Arnaud Spangenberg, Flaxlanden (FR); Romain Metillon, Combs la Ville (FR); Olivier Albenge, Mortcerf (FR)

(73) Assignees: SOCIETE BIC, Clichy (FR); UNIVERSITE DE HAUTE ALSACE, Mulhouse (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 353 days.

(21) Appl. No.: 17/296,176

(22) PCT Filed: Nov. 18, 2019

(86) PCT No.: PCT/EP2019/081573
§ 371 (c)(1),
(2) Date: May 21, 2021

(87) PCT Pub. No.: WO2020/104345
PCT Pub. Date: May 28, 2020

(65) Prior Publication Data
US 2022/0041876 A1 Feb. 10, 2022

(30) Foreign Application Priority Data
Nov. 22, 2018 (EP) .................................... 18306552

(51) Int. Cl.
*C09D 11/17* (2014.01)
*C09D 11/16* (2014.01)
*C09D 11/02* (2014.01)

(52) U.S. Cl.
CPC .............. *C09D 11/17* (2013.01); *C09D 11/02* (2013.01); *C09D 11/16* (2013.01)

(58) Field of Classification Search
CPC ......... C09D 11/17; C09D 11/16; C09D 11/00; C09D 11/02; C09D 11/10; C09D 11/14
(Continued)

(56) References Cited

U.S. PATENT DOCUMENTS 6,171,381 B1    1/2001  Matsumoto et al.
7,291,292 B2   11/2007  Ittel
(Continued)

FOREIGN PATENT DOCUMENTS

EP    0837113    4/1998
EP    2354193    8/2011
(Continued)

OTHER PUBLICATIONS

International Search Report dated Jan. 28, 2020 in corresponding PCT International Patent Application No. PCT/EP2019/081573, 5 pgs.
(Continued)

*Primary Examiner* — David J Walczak
(74) *Attorney, Agent, or Firm* — Ruggiero, McAllister & McMahon LLC

(57) ABSTRACT

There is a process for preparing in situ an aqueous gel ink with variable color having the following steps:
(i) preparing a gel-based matrix of aqueous ink comprising a reducing agent,
(ii) adding a solution of metallic salts,
(iii) adding iron powder to obtain an aqueous gel ink with variable color,
(Continued)

wherein the steps (ii) and (iii) can be interchanged.

There also is an aqueous gel ink with variable color obtained according to the process of the disclosure, having a reducing agent, metallic nanoparticles and iron powder.

There further is a writing instrument having an aqueous gel ink with variable color according to the disclosure.

19 Claims, 8 Drawing Sheets

(58) Field of Classification Search
USPC .. 106/31.6, 31.68, 31.69, 31.7, 31.71, 31.95
See application file for complete search history.

(56) References Cited

U.S. PATENT DOCUMENTS

| | | | |
|---|---|---|---|
| 8,376,644 | B2 | 2/2013 | Lugert et al. |
| 8,870,998 | B2 | 10/2014 | Berkei et al. |
| 2013/0171345 | A1 | 7/2013 | Sexton |
| 2022/0275226 | A1* | 9/2022 | Albenge ................ C09D 11/17 |

FOREIGN PATENT DOCUMENTS

| | | |
|---|---|---|
| EP | 2547477 | 7/2016 |
| GB | 2372255 | 8/2002 |
| JP | 2012-251222 | 12/2012 |
| WO | 2006/072959 | 7/2006 |
| WO | 2012/077043 | 6/2012 |

OTHER PUBLICATIONS

Written Opinion dated Jan. 28, 2020 in corresponding PCT International Patent Application No. PCT/EP2019/081573, 4 pgs.
Teyssier et al, "Photonic crystals cause active colour change in chameleons", Nature Communications 6, Article No. 6368, Mar. 10, 2015, 7 pgs.
International Search Report dated Jan. 31, 2020 in related PCT International Patent Application No. PCT/EP2019/081633, 4 pgs.
Written Opinion dated Jan. 31, 2020 in related PCT International Patent Application No. PCT/EP2019/081633, 5 pgs.
Rong Chen et al: "Fabrication of gold nanoparticles with different morphologies in HEPES buffer", Rare Metals, vol. 29, No. 2, Apr. 1, 2010 (Apr. 1, 2010), pp. 180-186.
The synthesis of SERS-active gold nanoflower tags for in vivo applications, ACS Nano, vol. 2, No. 12, Jan. 1, 2008 (Jan. 1, 2008), Abstract.

* cited by examiner

PROCESS FOR PREPARING AQUEOUS GEL INKS WITH VARIABLE COLOR, AND AQUEOUS GEL INKS THEREOF

CROSS REFERENCE TO RELATED APPLICATION(S)

This application is a National Stage Application of International Application No. PCT/EP2019/081573, filed on Nov. 18, 2019, now published as WO2020/104345 A1, which claims priority to European Application No. 18306552.3, filed on Nov. 22, 2018, the contents of which are incorporated herein by reference in their entireties.

FIELD OF THE DISCLOSURE

The present disclosure relates to a process for preparing in situ an aqueous gel ink with variable color, and to aqueous gel inks with variable color comprising a reducing agent, metallic nanoparticles and iron powder, obtained according to the process of the disclosure. The disclosure also relates to a writing instrument comprising an aqueous gel ink with variable color according to the disclosure.

DESCRIPTION OF THE RELATED ART

In nature, changing colors are frequently observed in the animal's world, either for camouflage or for courting by respectively fading in or standing out from the environment. Numerous living organisms can rapidly alter their appearance in response to changes in the environment. The most well-known examples are chameleons that are able to quickly change the color of their skin by aggregating or dispersing pigments within dermal chromatophores (3. Teyssier et al., Nature Communications 6, 2014, 6368).

Currently, there are two types of change in color present in nature that researches focus on structural and plasmonic color.

The structural color is observable on the wings of the morpho butterflies or on some plants and fruits. The color change is due to the light reflecting on the microstructures. Their specific shape ensures that the angle by which the light hits the wing influences the color reflected.

The plasmonic color effect is deeper than for the structural color. In fact, the change in color is due to both the light absorption by metallic nanoparticles and the spacing between them in the material. This effect can, for example, be observed amongst the chameleons. Indeed, the color of their skin can change if they get excited. The change of color is due to the guanine crystals contained in their skin, which get farther away from each other when they get angry.

Replicating the way animals change their color is not exactly practical for some types of objects, though it can be the inspiration for another approach of creating a color change in other matrix.

SUMMARY OF THE DISCLOSURE

On this basis, the inventors have surprisingly found that it is possible to obtain new aqueous gel inks that are capable of changing color when writing by replacing former aqueous gel inks containing dyes and pigments by new ones that are nanoparticles-based.

The present disclosure thus relates to a process for preparing in situ an aqueous gel ink with variable color comprising the following steps:

(i) preparing a gel-based matrix of aqueous ink comprising a reducing agent,
(ii) adding a solution of metallic salts,
(iii) adding iron powder to obtain an aqueous gel ink with variable color, wherein the steps (ii) and (iii) can be interchanged.

DETAILED DESCRIPTION OF THE DISCLOSURE

Figure 1:
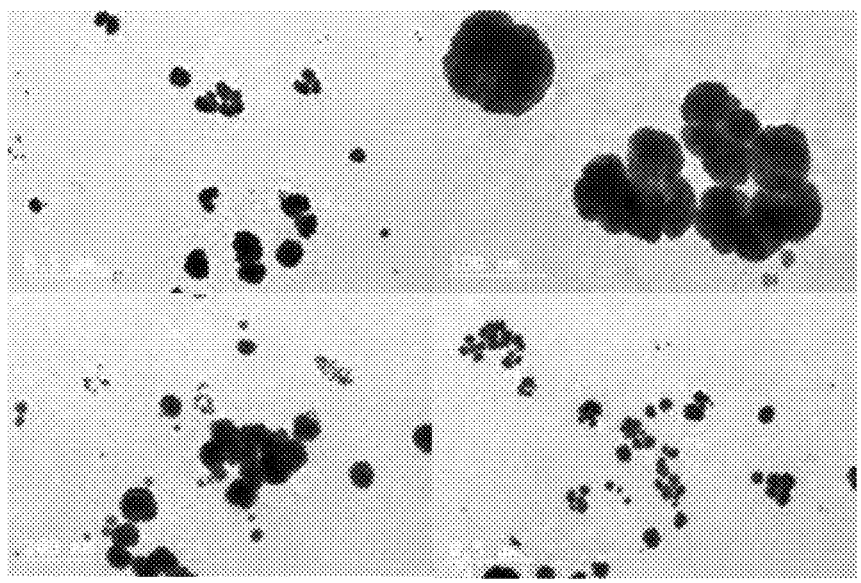
FIG. 1 shows TEM images of the gold nanoparticles dispersed in the gel-based matrix of aqueous ink comprising hydroxylamine.

The process of the disclosure is flexible in terms of use and performance, works in an ecologically viable manner, and also takes account of ecological requirements.

In the sense of the disclosure, the term "in situ" means that the metallic nanoparticles present in the aqueous gel ink of the disclosure are synthetized directly in the gel-based matrix of the aqueous ink.

In the sense of the disclosure, the term "variable color" means that the color of the aqueous gel ink of the disclosure is not the same, by visual observation, before and after application on a media.

According to a preferred embodiment of the disclosure, the media is an absorbing support wherein the absorbing support is a porous substrate, and more specifically an absorbing support chosen in the group consisting of paper, cardboard and textiles.

The change of color may be immediately observed, in particular in less than five seconds, and more specifically less than one second, by visual observation, when the aqueous gel ink of the disclosure is applied on a media, and more specifically on an absorbing support.

For the purposes of the present disclosure, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and advantageously between 150 and 400 mg/200 m of writing. It must also dry sufficiently rapidly to avoid smudging the writing medium. It must also avoid the problems of migration (bleeding) over time. Thus, the ink according to the present disclosure will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the disclosure, the writing ink being a "gel ink" (which corresponds therefore to a thixotropic ink), the viscosity measured at rest (at a shear rate of $0.01\ s^{-1}$) at 20° C. is different and in particular higher than the viscosity measured with a shear rate of $100\ s^{-1}$ at 20° C. using the same rheometer such as a cone-and-plate rheometer for example Malvern KINEXUS with a cone of 60 mm and an angle of 1°. In a particular embodiment, the viscosity of the gel ink according to the present disclosure measured under these conditions ranges from 1,000 to 7,000 mPa·s, advantageously from 2,000 to 5,000 mPa·s, and more advantageously from 2,500 to 3,500 mPa·s, with a shear rate of 1 $s^{-1}$, and advantageously from 5 to 50 mPa·s, more advantageously from 7 to 40 mPa·s, and still more advantageously from 10 to 20 mPa·s with a shear rate of 5,000 $s^{-1}$. Advantageously, such a viscosity is stable during storage for at least three months at 40° C. and 20% relative humidity, in particular the viscosity will not have a more than 50% decrease. More advantageously, the return to viscosity at rest after shear is very quick, advantageously at most a few minutes, in order to avoid the static leakage in the minutes after writing.

According to a preferred embodiment, the process of the disclosure comprises the following steps, in the above order:
(i) preparing a gel-based matrix of aqueous ink comprising a reducing agent,
(ii) adding a solution of metallic salts to the gel-based matrix of aqueous ink prepared in step (i),
(iii) adding iron powder to the dispersion of metallic nanoparticles obtained in step (ii), to obtain an aqueous gel ink with variable color.

In the present disclosure, the gel-based matrix of aqueous ink prepared in step (i) may comprise from 50 to 95%, more specifically from 60 to 90%, and even more specifically from 70 to 85%, by weight of water.

The gel-based matrix of aqueous ink prepared in step (i) may also comprise classic gel ink ingredients such as solvents, antimicrobial agents, corrosion inhibitors, antifoam agents, rheology modifiers, etc. The gel ink ingredients used to prepare the gel-based matrix of aqueous ink of step (i) will be largely described below, in relation with the subject-matter of the aqueous gel ink with variable color of the disclosure.

In the present disclosure, the reducing agent present in the gel-based matrix of aqueous ink of step (i) is advantageously chosen in the group consisting of hydroxylamine ($NH_2OH$), ascorbic acid, and mixture thereof.

The reducing agent reduces the metallic salts to elemental metal (i.e. oxidation state: 0).

In a preferred embodiment, the concentration of the reducing agent in the gel-based matrix of aqueous ink of step (i) ranges from 0.01 to 0.3 mol·$L^{-1}$, more specifically 0.01 to 0.07 mol·$L^{-1}$, and even more specifically 0.02 to 0.05 mol·$L^{-1}$.

In a preferred embodiment, the amount of reducing agent in the gel-based matrix of aqueous ink of step (i) ranges from 0.05 to 5%, more specifically from 0.07 to 4%, and even more specifically 0.09 to 3%, by weight relative to the total weight of the aqueous gel ink.

In the present disclosure, the solution of metallic salts is advantageously a solution of gold salts ($Au^{3+}$), silver salts ($Ag^+$), and mixture thereof. The solution of gold salts is more specifically a solution of gold (III) chloride trihydrate $HAuCl_4 \cdot 3H_2O$. The solution of silver salts is more specifically a solution of nitrate silver $AgNO_3$. Metallic nanoparticles are formed when contacting the metallic salts with the reducing agent.

In a preferred embodiment, the concentration of metallic salts in the gel-based matrix of aqueous ink of step (ii) ranges from 0.001 to 0.1 mol·$L^{-1}$, more specifically 0.015 to 0.08 mol·$L^{-1}$, and even more specifically 0.002 to 0.06 mol·$L^{-1}$.

In a preferred embodiment, the molar ratio between the metallic salts and the reducing agent ranges from 4 to 80%, and specifically from 10 to 30%. More specifically, when the reducing agent is hydroxylamine, the molar ratio between the metallic salts and hydroxylamine ranges from 4 to 30%. More specifically, when the reducing agent is ascorbic acid, the molar ratio between the metallic salts and ascorbic acid ranges from 20 to 80%.

In the present disclosure, the iron powder is advantageously constituted of iron nanoparticles having an average particle size ranging from 20 to 100 nm, and more specifically from 30 to 60 nm. This average particle size is determined by analysis of 2D images (microscope: JEOL ARM 200), according to the standard ISO9001:2015.

In a preferred embodiment, the concentration of iron powder in the aqueous gel ink with variable color ranges from 0.0001 to 0.04 mol·$L^{-1}$, more specifically from 0.0005 to 0.03 mol·$L^{-1}$, and even more specifically from 0.001 to 0.02 mol·$L^{-1}$.

The process of the disclosure can be performed over a wide range of temperature. In general, the process is performed within the temperature range of 0 to 100° C., more specifically 5 to 70° C., and even more specifically 10 to 40° C. The relatively low process temperatures contribute to process efficiency and process economy, and additionally meet the current ecological demands. Indeed, the process of the disclosure is performed in aqueous media, and is therefore a "green process". In addition, lower temperatures have the advantage that more stable dispersions are obtained and the metallic nanoparticles exhibit better redispersibility.

The present disclosure also concerns an aqueous gel ink with variable color obtained according to the process of the disclosure, the aqueous gel comprising a reducing agent, metallic nanoparticles and iron powder. In this aqueous gel ink with variable color, the reducing agent, metallic nanoparticles, and iron powder, are as defined above in relation with the subject-matter of the process of the disclosure.

Depending on their size, shape, and distance, the color of the dispersion of the metallic nanoparticles can change, as well as its properties. This is due to the plasmon resonance. The exposure of the metallic nanoparticles to a certain frequency of waves brings the electrons to gather in a certain place, which changes in accordance with the size and shape of the metallic nanoparticles. This agglomeration of electrons provokes an anisotropy of the metallic nanoparticle, which will then lead to a change of light absorption and scattering, resulting in a specific color. Plasmon resonance is also affected by the distance between the metallic nanoparticles due to the coupling of the metallic nanoparticles. Indeed, the closer the metallic nanoparticles are, the more they will interact with each other, which will increase their coupling effect also called plasmon effect. In the same way, the shape influences the plasmon resonance.

In the aqueous gel ink with variable color of the disclosure, the reducing agent is advantageously chosen in the group consisting of hydroxylamine ($NH_2OH$), ascorbic acid, and mixture thereof.

In the aqueous gel ink with variable color of the disclosure, the amount of reducing agent advantageously ranges from 0.05 to 5%, more specifically from 0.07 to 4%, and even more specifically 0.09 to 3%, by weight relative to the total weight of the aqueous gel ink.

In the aqueous gel ink with variable color of the disclosure, the metallic nanoparticles are advantageously chosen in the group consisting of gold nanoparticles, silver nanoparticles, and mixture thereof. The metallic nanoparticles of the disclosure may be more specifically gold or silver nanoparticles with the shape of spheres.

In the aqueous gel ink with variable color of the disclosure, the metallic nanoparticles of the disclosure have more specifically an average particle size ranging from 1 to 100 nm, and even more specifically from 10 to 60 nm. This average particle size is determined by analysis of 2D images (microscope: JEOL ARM 200), according to the standard ISO9001:2015.

According to a preferred embodiment, the distance between the metallic nanoparticles within the aqueous gel ink of the disclosure is lower than 100 nm, more specifically varies from 10 to 100 nm, and even more specifically varies from 30 to 70 nm.

In the aqueous gel ink with variable color of the disclosure, the amount of metallic nanoparticles advantageously ranges from 0.01 to 1%, and more advantageously from 0.02 to 0.8%, by weight relative to the total weight of the aqueous gel ink.

In the aqueous gel ink with variable color of the disclosure, the iron powder is advantageously constituted of iron nanoparticles having an average particle size ranging from 20 to 100 nm, and more specifically from 30 to 60 nm. This average particle size is determined by analysis of 2D images (microscope: JEOL ARM 200), according to the standard ISO9001:2015.

In the aqueous gel ink with variable color of the disclosure, the amount of iron powder advantageously ranges from 0.0001 to 0.04%, more advantageously from 0.0005 to 0.03%, and even more advantageously from 0.001 to 0.02%, by weight relative to the total weight of the aqueous gel ink.

In the aqueous gel ink with variable color of the disclosure, the amount of water advantageously ranges from 50 to 95%, and more advantageously from 60 to 90%, and even more advantageously from 70 to 85%, by weight relative to the total weight of the aqueous gel ink.

The aqueous gel ink with variable color of the disclosure may also comprise classic gel ink ingredients such as solvents, antimicrobial agents, corrosion inhibitors, antifoam agents, rheology modifiers, as described below. These gel ink ingredients are added to the gel-based matrix of aqueous ink in step (i) of the process of the disclosure.

The aqueous gel ink of the disclosure may comprise a solvent. Among the solvents that can be used, mention may be made of polar solvents miscible in water such as:

glycol ethers such as triethylene glycol, polyethylene glycol, diethylene glycol monoethyl ether, diethyleneglycol-mono butyl ether, dipropyleneglycol monobutyl ether, tripropylene glycol monomethyl ether, phenoxyethanol, phenoxypropanol, alcohols: linear or branched alcohol in Ci-C15 such as isopropanol, butanol, isobutanol, pentanol, benzyl alcohol, glycerin, diglycerin, polyglycerin, esters such as ethyl acetate or propyl acetate, carbonate esters such as propylene carbonate or ethylene carbonate, ketones such as methylisobutylketone (MIBK), acetone or cyclohexanone, and mixtures thereof.

In a preferred embodiment, the solvent comprises at least a glycol ether chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixtures thereof. In a further advantageous embodiment, the solvent is chosen in the group consisting of triethylene glycol, polyethylene glycol, and mixture thereof.

Advantageously, the solvent is present in the aqueous gel ink of the disclosure in an amount ranging from 5 to 30%, more advantageously from 7 to 25%, and even more advantageously from 12 to 20%, by weight relative to the total weight of the aqueous gel ink.

The aqueous gel ink of the disclosure may comprise an antimicrobial agent such as isothiazolinone (ACTICIDE® from Thor), more specifically chosen in the group consisting of 1,2-benzisothiazolin-3-one, 2-methyl-4-isothiazolin-3-one, and mixture thereof.

Advantageously, the antimicrobial agent is present in the aqueous gel ink of the disclosure in an amount ranging from 0.01 to 0.5%, and more advantageously from 0.1 to 0.2%, by weight relative to the total weight of the aqueous gel ink.

The aqueous gel ink of the disclosure may comprise a corrosion inhibitor, more specifically chosen in the group consisting of tolytriazole, benzotriazole, and mixture thereof.

Advantageously, the corrosion inhibitor is present in the aqueous gel ink of the disclosure in an amount ranging from 0.05 to 1%, more advantageously from 0.07 to 0.5%, and even more specifically from 0.08 to 0.15%, by weight relative to the total weight of the aqueous gel ink.

The aqueous gel ink of the disclosure may comprise an antifoam agent, more specifically a polysiloxane-based antifoam agent, and even more specifically an aqueous emulsion of modified polysiloxane (such as MOUSSEX® from Synthron, TEGO® Foamex from Evonik).

Advantageously, the antifoam agent is present in the aqueous gel ink of the disclosure in an amount ranging from 0.05 to 1%, more advantageously from 0.1 to 0.5%, and even more advantageously from 0.2 to 0.4%, by weight relative to the total weight of the aqueous gel ink.

The aqueous gel ink of the disclosure may comprise a rheology modifier capable of generating a gelling effect, more specifically chosen in the group consisting of xanthan gum, gum arabic, and mixture thereof.

Advantageously, the rheology modifier is present in an amount ranging from 0.08 to 2%, even more specifically from 0.2 to 0.8%, and even more specifically from 0.3 to 0.6%, by weight relative to the total weight of the aqueous gel ink.

The aqueous gel ink with variable color of the disclosure may also comprise other additives such as:
  pH regulators like sodium hydroxide and triethanolamine,
  lubricants,
  coalescing agents,
  crosslinking agents,
  wetting agents,
  plasticizers,
  antioxidants, and
  UV stabilizers.

When present, these additives are added to the gel-based matrix of aqueous ink in step (i) of the process of the disclosure.

The present disclosure also concerns a method of writing with an aqueous gel ink of variable color comprising the step of writing onto a media, more specifically on an absorbing support wherein the absorbing support is a porous substrate, and even more specifically on paper, cardboard, or textiles, with an aqueous gel ink with variable color according to the disclosure.

After writing onto a media, more specifically onto an absorbing support wherein the absorbing support is a porous substrate, and even more specifically onto paper, cardboard, or textiles, with the aqueous gel ink of variable color of the disclosure, the distance between the metallic nanoparticles in the aqueous gel ink applied on the media is lower than 1 µm, more specifically varies from 1 nm to 1 µm, and even more specifically varies from 70 to 150 nm.

Finally, the present disclosure concerns a writing instrument comprising:
  an axial barrel containing the aqueous gel ink according to the disclosure, and
  a pen body which delivers the aqueous gel ink stored in the axial barrel.

The writing instrument of the disclosure may be chosen in the group consisting of gel pens, felt pens, correction fluid, markers, and more specifically gel pens.

In addition to the foregoing, the disclosure also comprises other provisions which will emerge from the additional description which follows, which relates to the preparation of aqueous gel inks with variable color according to the process of the disclosure and comparative examples, as well as to FIGS. 1 to 16 which show Transmission Electron Microscopy (TEM) and Scanning Electron Microscopy (SEM) images of metallic nanoparticles dispersed in the gel-based matrix of aqueous inks and on cellulosic papers, prepared according to examples 1 to 4 and to comparative examples 1 to 4.

EXAMPLES

Example 1: Preparation of an Aqueous Gel Ink with Variable Color Based on Hydroxylamine, Gold Nanoparticles and Iron Powder, According to the Process of the Present Disclosure In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 µL of a solution of hydroxylamine hydrochloride (55459 Honeywell Fluka™) (100 mM). The mixture was homogeneized with a homogeneizer mixer at a speed of 15 m·s$^{-1}$ during 2 minutes.

In a second step (ii), 100 µL of a solution of gold (III) chloride trihydrate (520918-1G Sigma-Aldrich) (100 mM) was introduced into the mixture, and homogeneized at a speed of 400 rpm during 5 to 10 minutes. The mixture changed of color from transparent to yellow.

In a third step (iii), 0.0101 g of iron powder (spherical iron powder, <10 µm, Reference: 00170, from Alfa Aesar) was added to the dispersion of gold nanoparticles obtained at the end of step (ii). The mixture was homogenized with a homogenizing mixer at a speed of 15 m·s$^{-1}$ during 5 to 10 minutes. After adding the iron powder, the color changed from yellow to purple.

Figure 2:
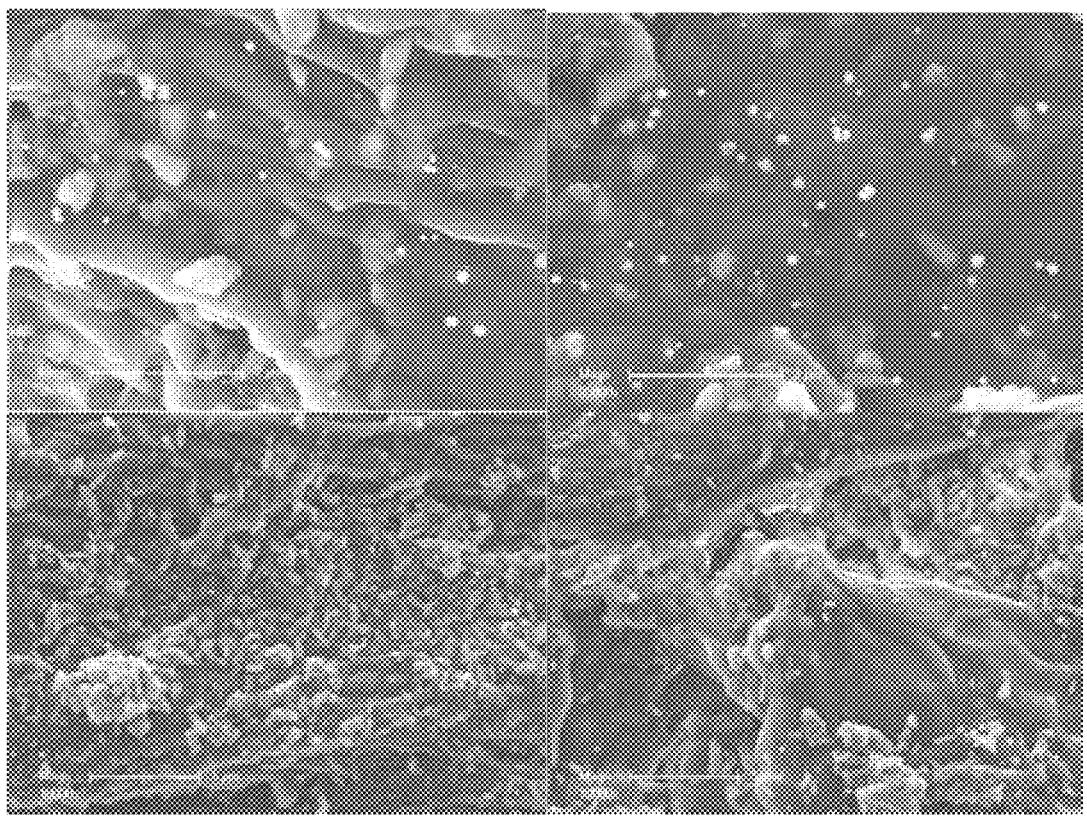
FIG. 2 shows SEM images of the gold nanoparticles once the aqueous gel ink is applied on a cellulosic paper A4 80 $g \cdot m^{-2}$.

FIG. 1 shows TEM images (apparatus: JEOL ARM200) of the gold nanoparticles dispersed in the gel-based matrix of aqueous ink comprising hydroxylamine and FIG. 2 shows SEM images (apparatus: MEB Philips XL30) of the gold nanoparticles once the aqueous gel ink is applied on a cellulosic paper A4 80 g·m$^{-2}$ (INACOPIA Elite). The average particle size of the gold nanoparticles is of 100 nm.

When the obtained aqueous gel ink with variable color was written on the cellulosic paper, the color changed from purple to green through a dissemination process of the gold nanoparticles on the cellulosic paper.

Example 2: Preparation of an Aqueous Gel Ink with Variable Color Based on Ascorbic Acid, Gold Nanoparticles and Iron Powder, According to the Process of the Present Disclosure In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 µL of a solution of L-ascorbic acid (A92902-100G Sigma-Aldrich) (0.045 g in 500 µL of water). The mixture was homogeneized with a homogeneizer mixer at a speed of 15 m·s$^{-1}$ during 2 minutes.

In a second step (ii), 100 µL of a solution of gold (III) chloride trihydrate (520918-1G Sigma-Aldrich) (100 mM) was introduced into the mixture, and homogeneized at a speed of 400 rpm during 5 to 10 minutes. The mixture changed of color from transparent to opaque.

In a third step (iii), 0.0158 g of iron powder (spherical iron powder, <10 µm, Reference: 00170, from Alfa Aesar) was added to the dispersion of gold nanoparticles obtained at the end of step (ii). The mixture was homogenized with a homogenizing mixer at a speed of 15 m·s$^{-1}$ during 5 to 10 minutes. After adding the iron powder, the color changed from opaque to grey.

Figure 3:
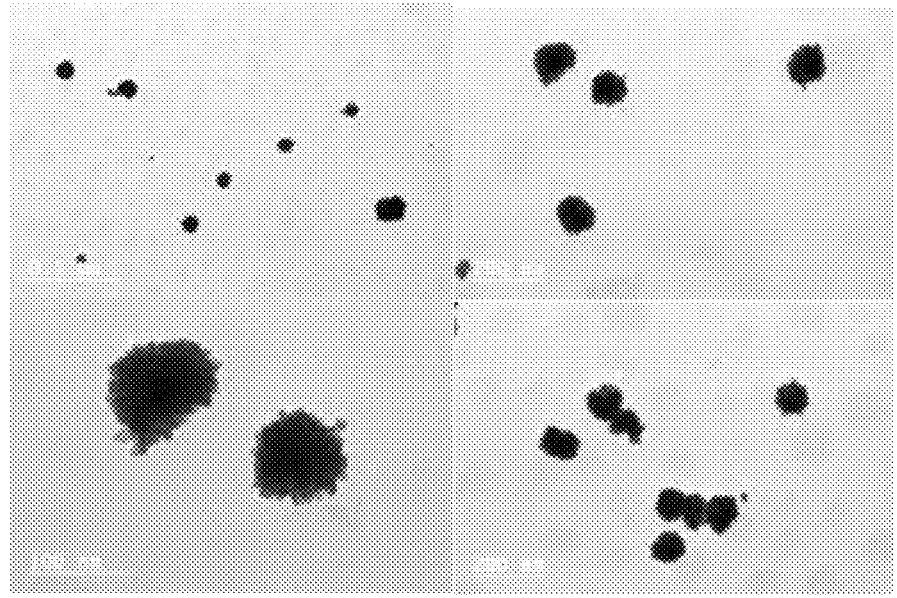
FIG. 3 shows TEM images of the gold nanoparticles dispersed in the gel-based matrix of aqueous ink comprising ascorbic acid.
Figure 4:
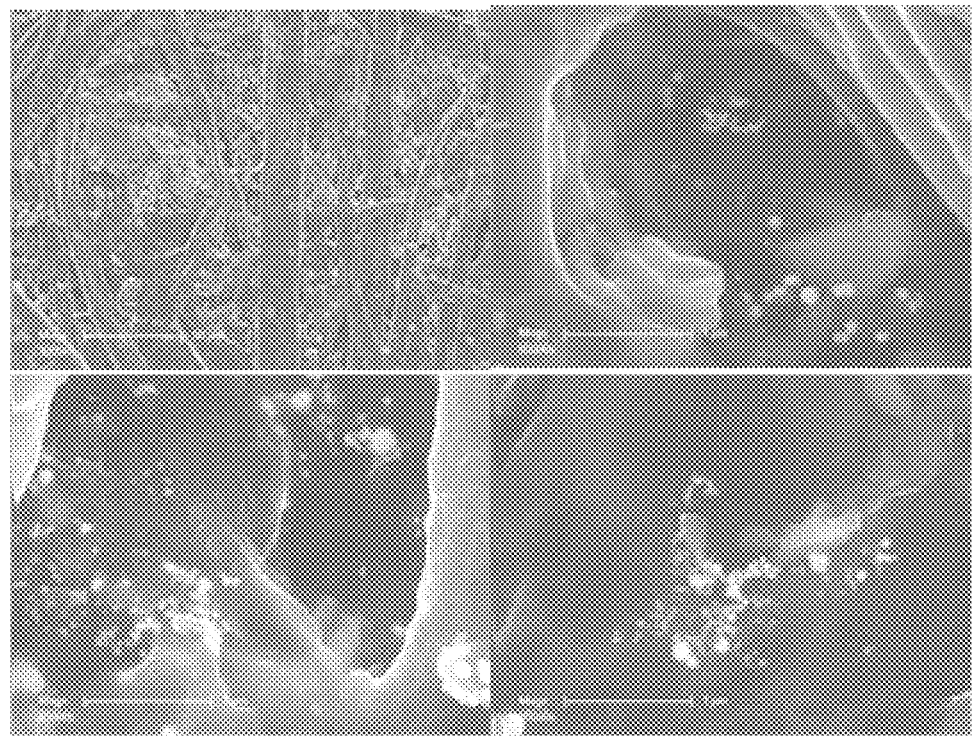
FIG. 4 shows SEM images of the gold nanoparticles once the aqueous gel ink is applied on a cellulosic paper A4 80 $g \cdot m^{-2}$.

FIG. 3 shows TEM images (apparatus: JEOL ARM200) of the gold nanoparticles dispersed in the gel-based matrix of aqueous ink comprising ascorbic acid and FIG. 4 shows SEM images (apparatus: MEB Philips XL30) of the gold nanoparticles once the aqueous gel ink is applied on a cellulosic paper A4 80 g·m$^{-2}$ (INACOPIA Elite). The average particle size of the gold nanoparticles is of 100 nm.

When the obtained aqueous gel ink with variable color was written on the cellulosic paper, the color changed from dark brown to black through a dissemination process of the gold nanoparticles on the cellulosic paper.

Example 3: Preparation of an Aqueous Gel Ink with Variable Color Based on Ascorbic Acid, Silver Nanoparticles and Iron Powder, According to the Process of the Present Disclosure In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 0.0356 g of L-ascorbic acid (A92902-100G Sigma-Aldrich). The mixture was homogeneized with a homogeneizer mixer at a speed of 15 m·s$^{-1}$ during 2 minutes.

In a second step (ii), 300 µL of a solution of silver nitrate (9370.1 Carl Roth) (200 mM) was introduced into the mixture, and homogeneized at a speed of 400 rpm during 5 to 10 minutes. The mixture changed of color from transparent to opaque.

In a third step (iii), 0.0158 g of iron powder (spherical iron powder, <10 µm, Reference: 00170, from Alfa Aesar) was added to the dispersion of silver nanoparticles obtained at the end of step (ii). The mixture was homogenized with a homogenizing mixer at a speed of 15 m·s$^{-1}$ during 5 to 10 minutes. After adding the iron powder, the color changed from opaque to grey.

Figure 5:
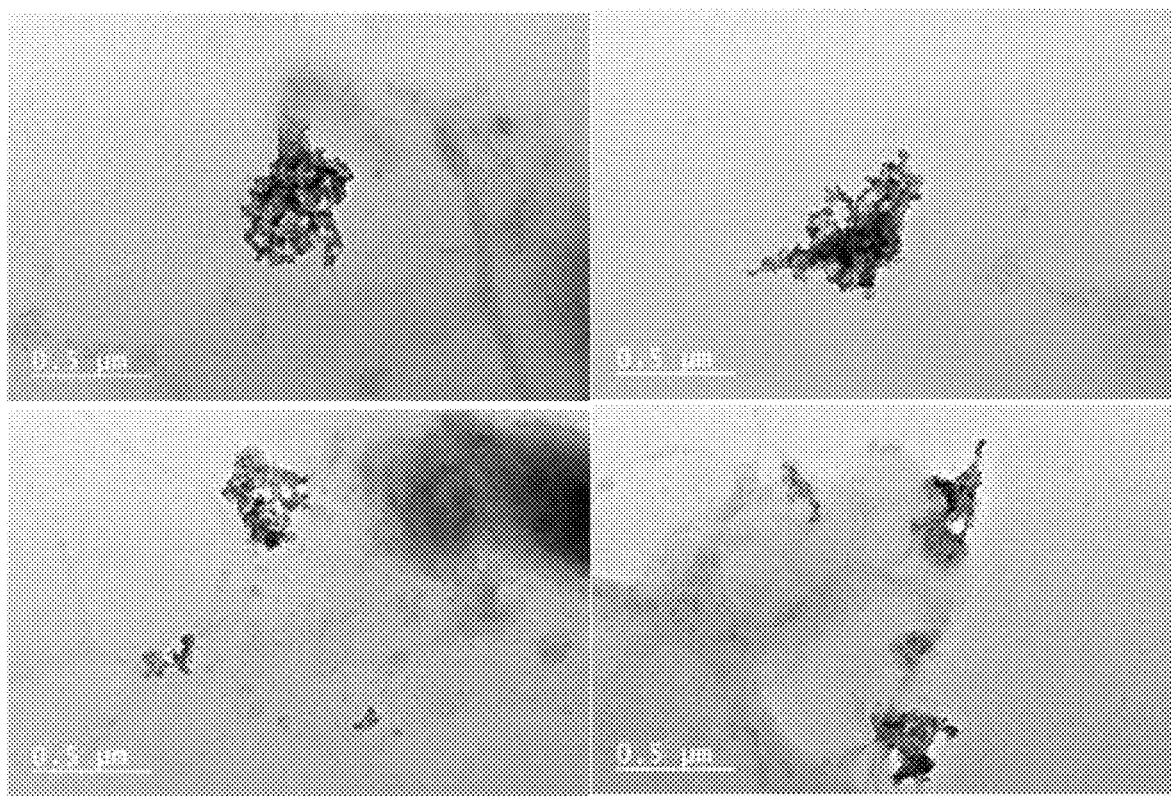
FIG. 5 shows TEM images of the silver nanoparticles dispersed in the gel-based matrix of aqueous ink comprising ascorbic acid.
Figure 6:
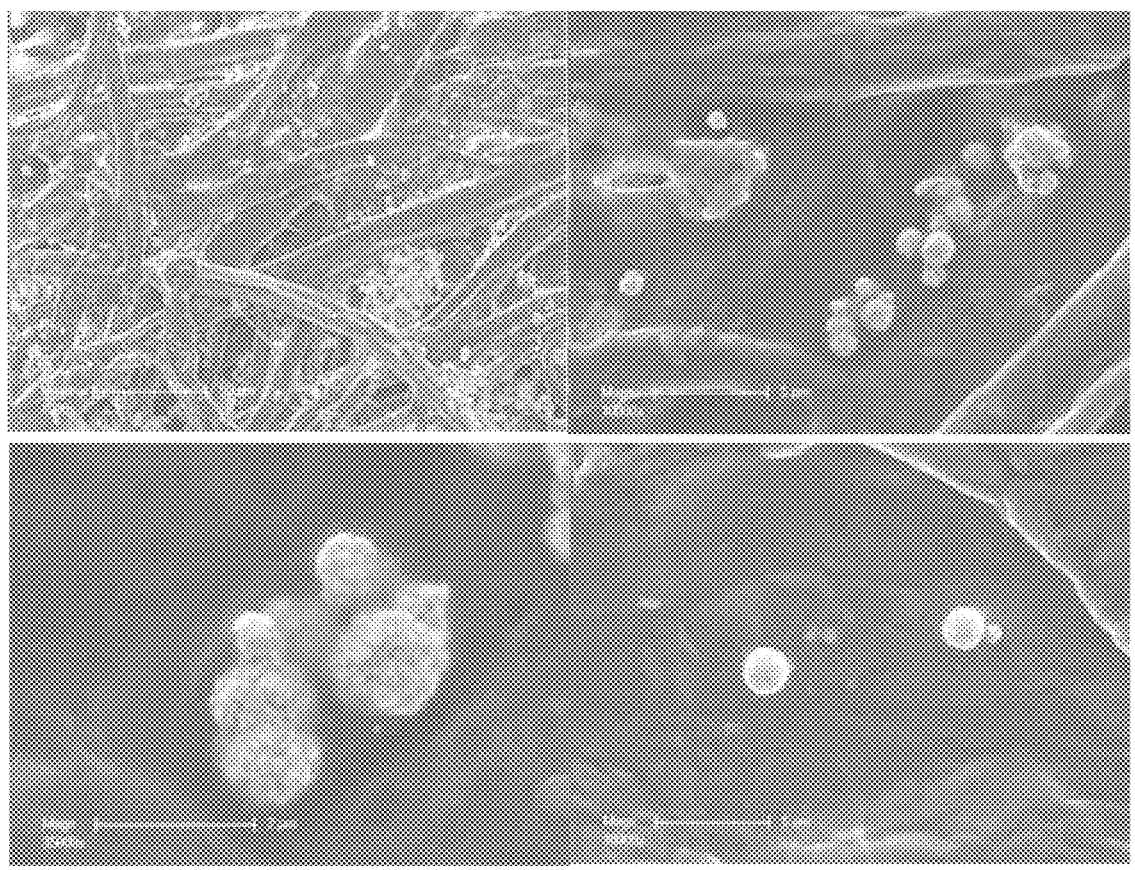
FIG. 6 shows SEM images of the silver nanoparticles once the aqueous gel ink is applied on a cellulosic paper A4 80 $g \cdot m^{-2}$.

FIG. 5 shows TEM images (apparatus: JEOL ARM200) of the silver nanoparticles dispersed in the gel-based matrix of aqueous ink comprising ascorbic acid and FIG. 6 shows SEM images (apparatus: MEB Philips XL30) of the silver nanoparticles once the aqueous gel ink is applied on a cellulosic paper A4 80 g·m$^{-2}$ (INACOPIA Elite). The average particle size of the silver nanoparticles is of 1 µm.

When the obtained aqueous gel ink with variable color was written on the cellulosic paper, the color changed from grey to brown through a dissemination process of the silver nanoparticles on the cellulosic paper.

Example 4: Preparation of an Aqueous Gel Ink with Variable Color Based on Hydroxylamine, Silver Nanoparticles and Iron Powder, According to the Process of the Present Invention In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 µL of a solution of hydroxylamine hydrochloride (55459 Honeywell Fluka™) (100 mM). The mixture was homogeneized with a homogeneizer mixer at a speed of 15 m·s$^{-1}$ during 2 minutes.

In a second step (ii), 200 µL of a solution of silver nitrate (9370.1 Carl Roth) (200 mM) was introduced into the mixture, and homogeneized at a speed of 400 rpm during 5 to 10 minutes.

In a third step (iii), 0.0028 g of iron powder (spherical iron powder, <10 µm, Reference: 00170, from Alfa Aesar) was added to the dispersion of silver nanoparticles obtained at the end of step (ii). The mixture was homogenized with a homogenizing mixer at a speed of 15 m·s$^{-1}$ during 5 to 10 minutes. After adding the iron powder, the color appeared grey.

Figure 7:
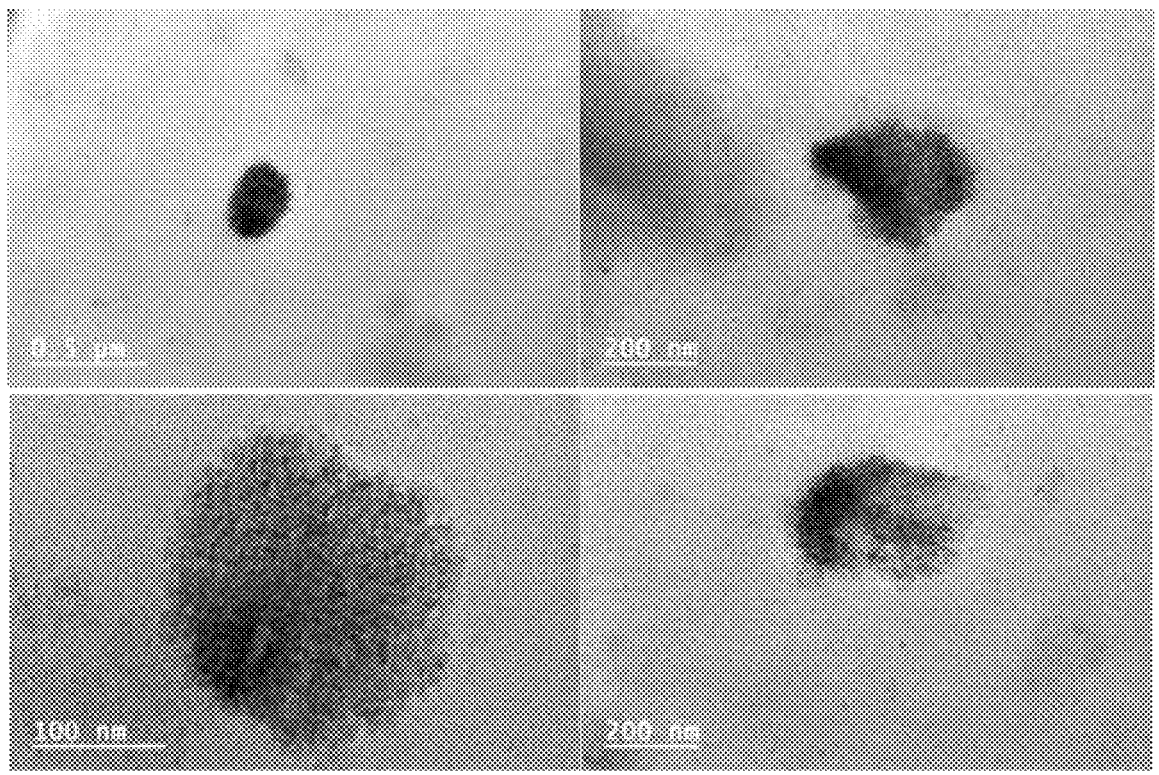
FIG. 7 shows TEM images of the silver nanoparticles dispersed in the gel-based matrix of aqueous ink comprising hydroxylamine.
Figure 8:
FIG. 8 shows SEM images of the silver nanoparticles once the aqueous gel ink is applied on a cellulosic paper A4 80 $g \cdot m^{-2}$.

FIG. 7 shows TEM images (apparatus: JEOL ARM200) of the silver nanoparticles dispersed in the gel-based matrix of aqueous ink comprising hydroxylamine and FIG. 8 shows SEM images (apparatus: MEB Philips XL30) of the silver nanoparticles once the aqueous gel ink is applied on a cellulosic paper A4 80 g·m$^{-2}$ (INACOPIA Elite) (not visible by SEM). The average particle size of the silver nanoparticles is of 150 nm.

When the obtained aqueous gel ink with variable color was written on the cellulosic paper, the color changed from grey to brown through a dissemination process of the silver nanoparticles on the cellulosic paper.

Comparative Example 1: Preparation of an Aqueous Gel Ink Based on Hydroxylamine and Gold Nanoparticles, without Iron Powder In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 µL of a solution of hydroxylamine hydrochloride (55459 Honeywell Fluka™) (100 mM). The mixture was homogeneized with a homogeneizer mixer at a speed of 15 m·s$^{-1}$ during 2 minutes.

In a second step, 100 µL of a solution of gold (III) chloride trihydrate (520918-1G Sigma-Aldrich) (100 mM) was introduced into the mixture, and homogeneized at a speed of 400 rpm during 5 to 10 minutes. The mixture changed of color from transparent to gold.

Figure 9:
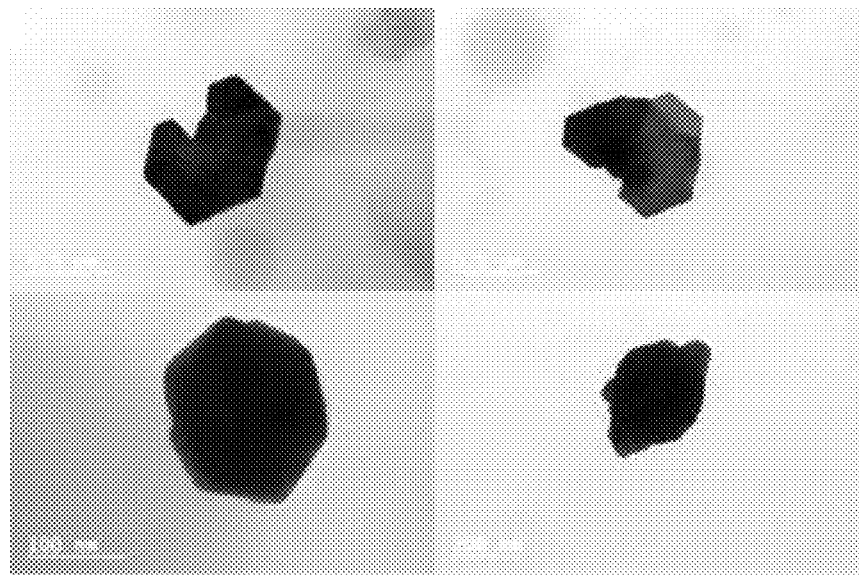
FIG. 9 shows TEM images of the gold nanoparticles dispersed in the gel-based matrix of aqueous ink comprising hydroxylamine.
Figure 10:
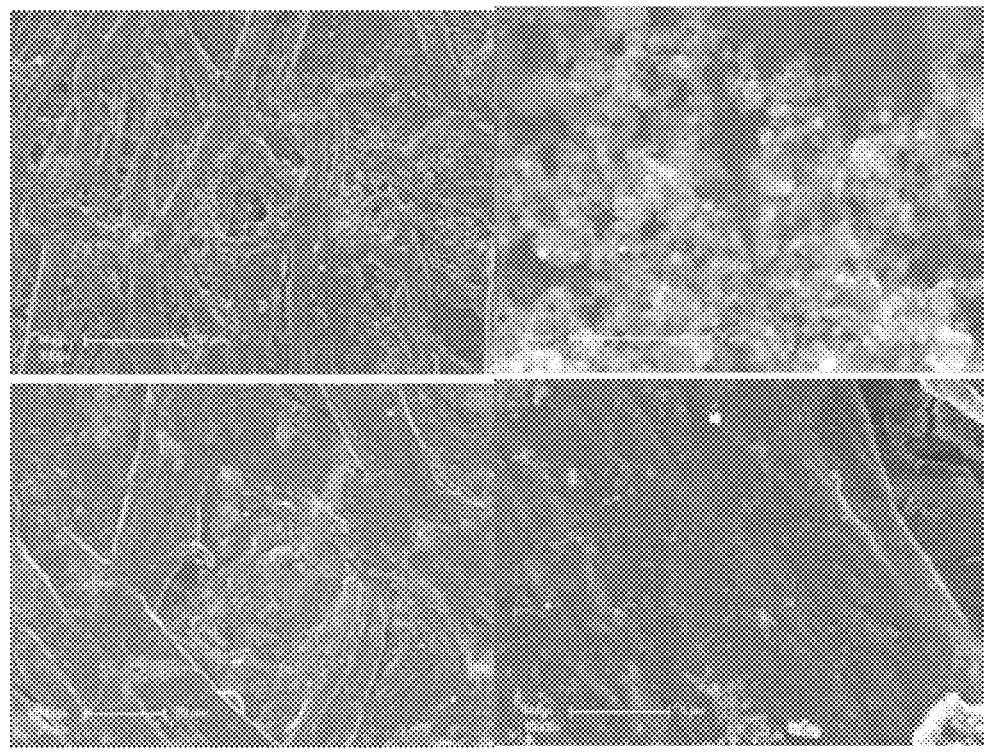
FIG. 10 shows SEM images of the gold nanoparticles once the aqueous gel ink is applied on a cellulosic paper A4 80 $g \cdot m^{-2}$.

FIG. 9 shows TEM images (apparatus: JEOL ARM200) of the gold nanoparticles dispersed in the gel-based matrix of aqueous ink comprising hydroxylamine and FIG. 10 shows SEM images (apparatus: MEB Philips XL30) of the gold nanoparticles once the aqueous gel ink is applied on a cellulosic paper A4 80 g·m$^{-2}$ (INACOPIA Elite). The gold nanoparticles are very few and of polyhedral shape. The average particle size of the gold nanoparticles is of 350 nm.

When the obtained aqueous gel ink with variable color was written on the cellulosic paper, the color did not change and remained gold.

Comparative Example 2: Preparation of an Aqueous Gel Ink Based on Ascorbic Acid and Gold Nanoparticles, without Iron Powder In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 µL of of a solution of L-ascorbic acid (A92902-100G Sigma-Aldrich) (0.045 g in 500 µL of water). The mixture was homogeneized with a homogeneizer mixer at a speed of 15 m·s$^{-1}$ during 2 minutes.

In a second step, 100 µL of a solution of gold (III) chloride trihydrate (520918-1G Sigma-Aldrich) (100 mM) was introduced into the mixture, and homogeneized at a speed of 400 rpm during 5 to 10 minutes. The mixture changed of color from transparent to opaque.

Figure 11:
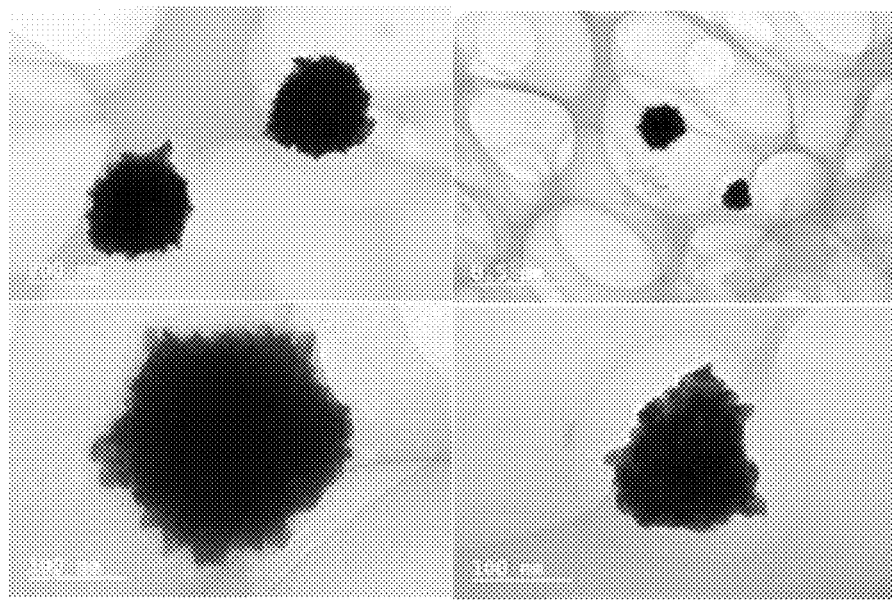
FIG. 11 shows TEM images of the gold nanoparticles dispersed in the gel-based matrix of aqueous ink comprising ascorbic acid.
Figure 12:
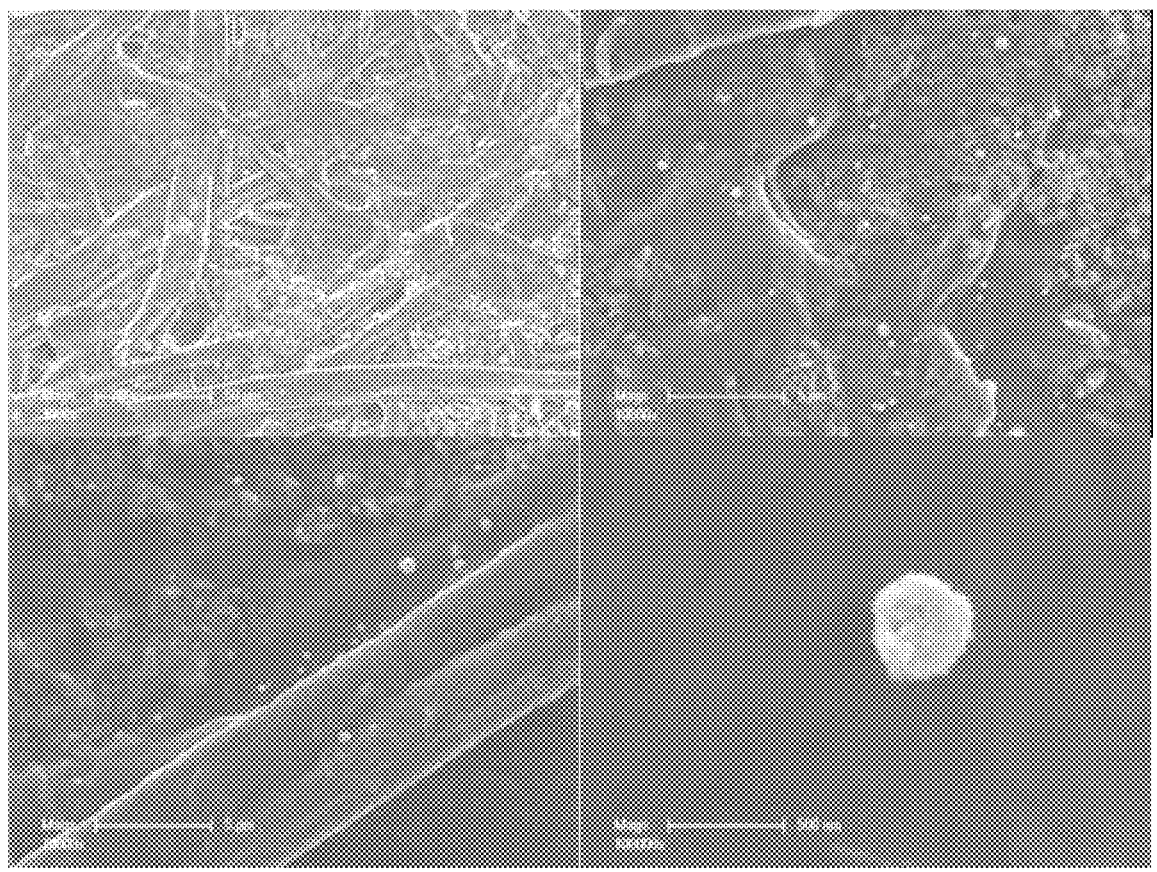
FIG. 12 shows SEM images of the gold nanoparticles once the aqueous gel ink is applied on a cellulosic paper A4 80 $g \cdot m^{-2}$.

FIG. 11 shows TEM images (apparatus: JEOL ARM200) of the gold nanoparticles dispersed in the gel-based matrix of aqueous ink comprising ascorbic acid and FIG. 12 shows SEM images (apparatus: MEB Philips XL30) of the gold nanoparticles once the aqueous gel ink is applied on a cellulosic paper A4 80 g·m$^{-2}$ (INACOPIA Elite). The average particle size of the gold nanoparticles is of 200 nm.

When the obtained aqueous gel ink with variable color was written on the cellulosic paper, the color did not change and remained opaque.

Comparative Example 3: Preparation of an Aqueous Gel Ink Based on Ascorbic Acid and Silver Nanoparticles, without Iron Powder In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 0.0356 g of L-ascorbic acid (A92902-100G Sigma-Aldrich). The mixture was homogeneized with a homogeneizer mixer at a speed of 15 m·s$^{-1}$ during 2 minutes.

In a second step, 300 µL of silver nitrate (9370.1 Carl Roth) (200 mM) was introduced into the mixture, and homogeneized at a speed of 400 rpm during 5 to 10 minutes. The mixture changed of color from transparent to opaque.

Figure 13:
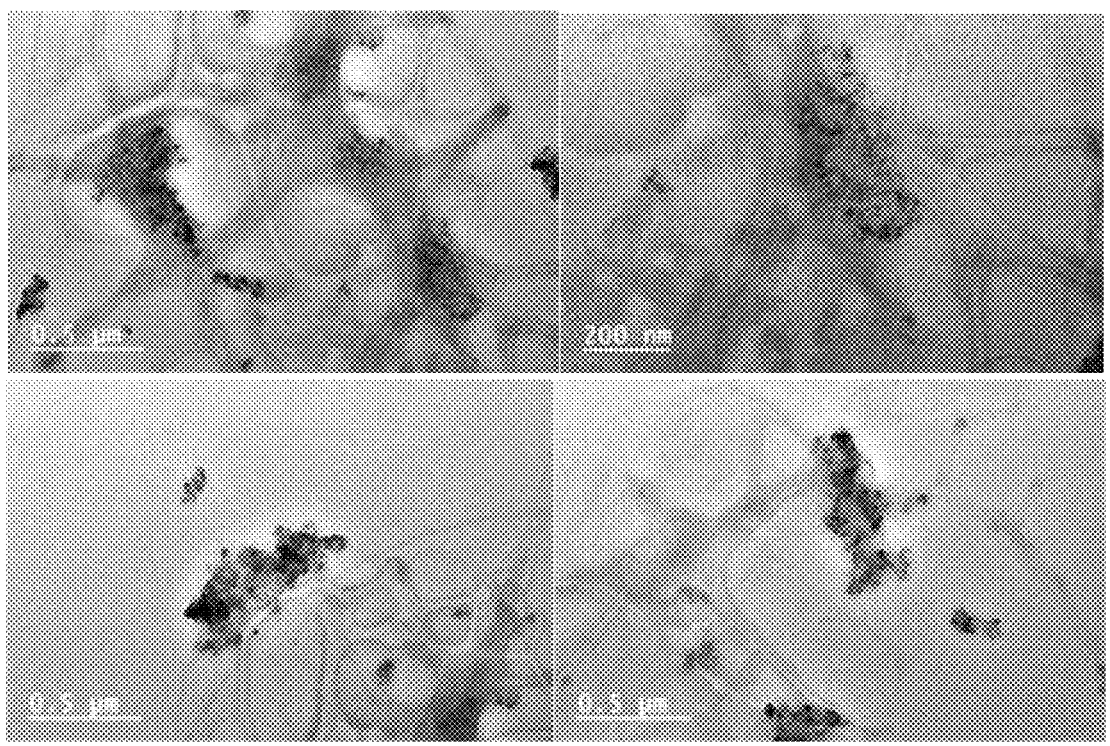
FIG. 13 shows TEM images of the silver nanoparticles dispersed in the gel-based matrix of aqueous ink comprising ascorbic acid.
Figure 14:
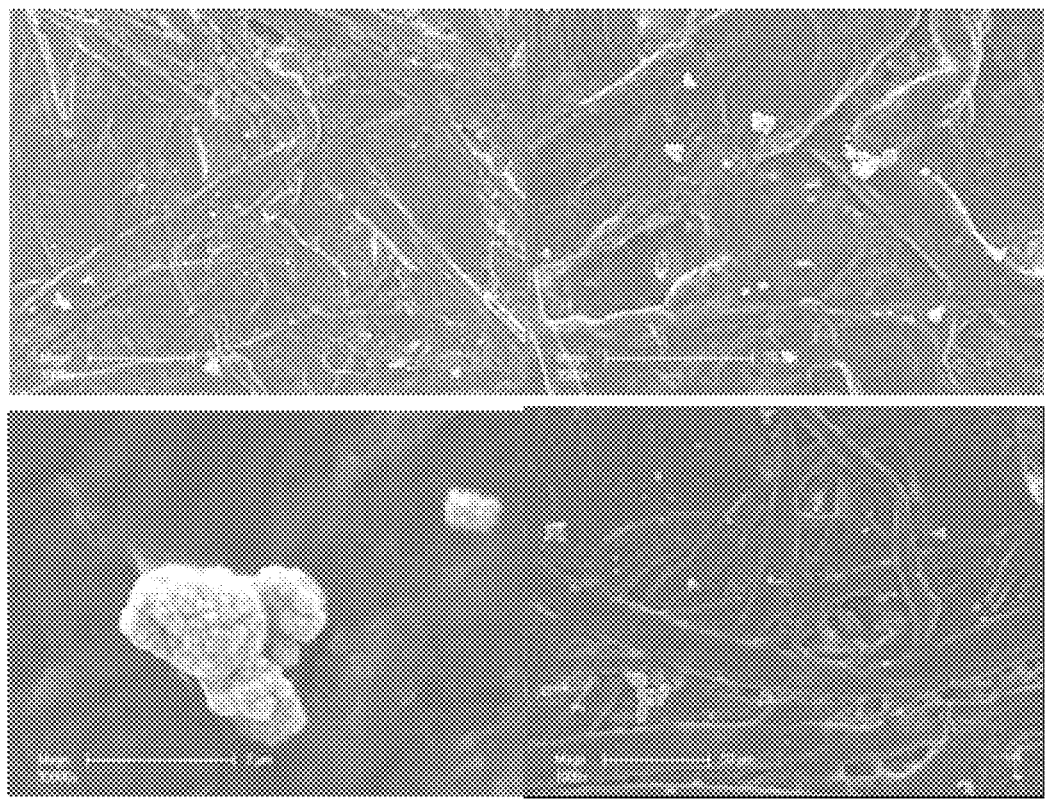
FIG. 14 shows SEM images of the silver nanoparticles once the aqueous gel ink is applied on a cellulosic paper A4 80 $g \cdot m^{-2}$.

FIG. 13 shows TEM images (apparatus: JEOL ARM200) of the silver nanoparticles dispersed in the gel-based matrix of aqueous ink comprising ascorbic acid and FIG. 14 shows SEM images (apparatus: MEB Philips XL30) of the silver nanoparticles once the aqueous gel ink is applied on a cellulosic paper A4 80 g·m$^{-2}$ (INACOPIA Elite). The average particle size of the silver nanoparticles is of 5 µm.

When the obtained aqueous gel ink with variable color was written on the cellulosic paper, the color did not change and remained opaque.

Comparative Example 4: Preparation of an Aqueous Gel Ink Based on Hydroxylamine and Silver Nanoparticles, without Iron Powder In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 500 μL of a solution of hydroxylamine hydrochloride (55459 Honeywell Fluka™) (100 mM). The mixture was homogeneized with a homogeneizer mixer at a speed of 15 m·s$^{-1}$ during 2 minutes.

In a second step, 200 μL of silver nitrate (9370.1 Carl Roth) (200 mM) was introduced into the mixture, and homogeneized at a speed of 400 rpm during 5 to 10 minutes. The mixture changed of color from transparent to opaque.

Figure 15:
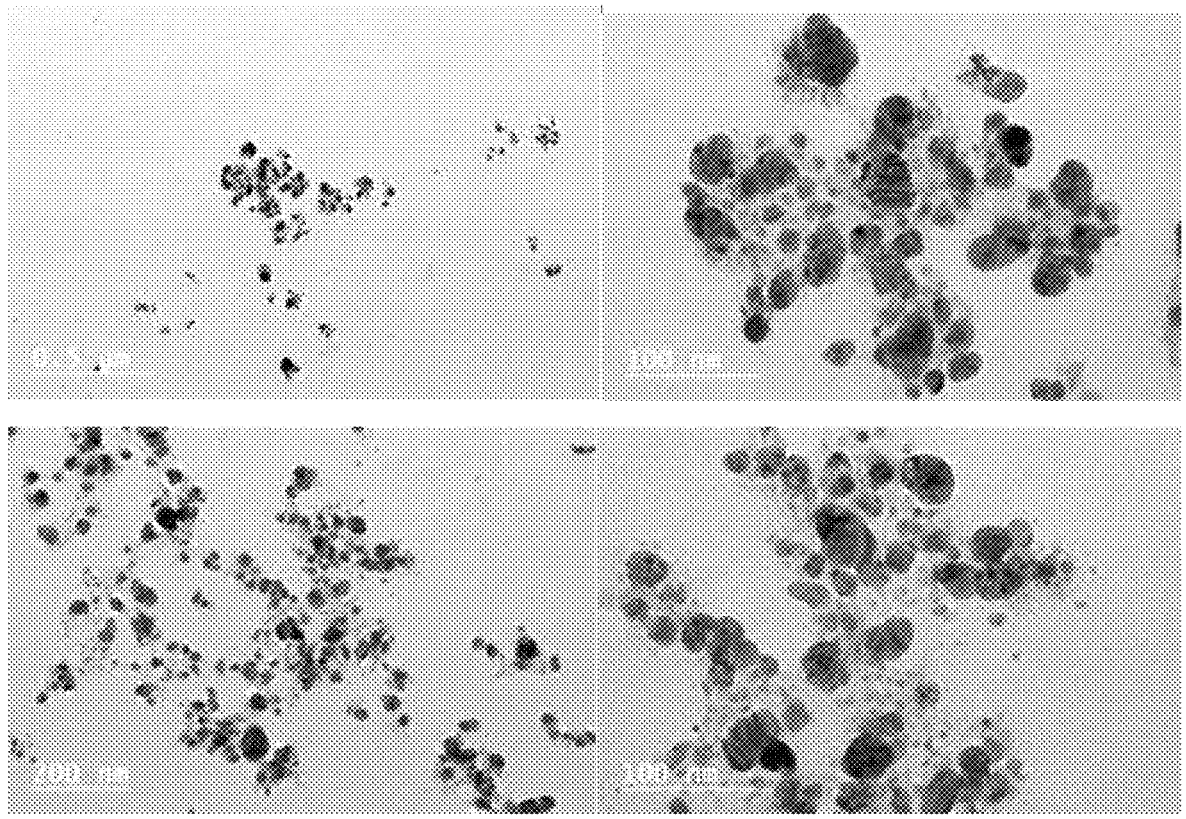
FIG. 15 shows TEM images of the silver nanoparticles dispersed in the gel-based matrix of aqueous ink comprising hydroxylamine.
Figure 16:
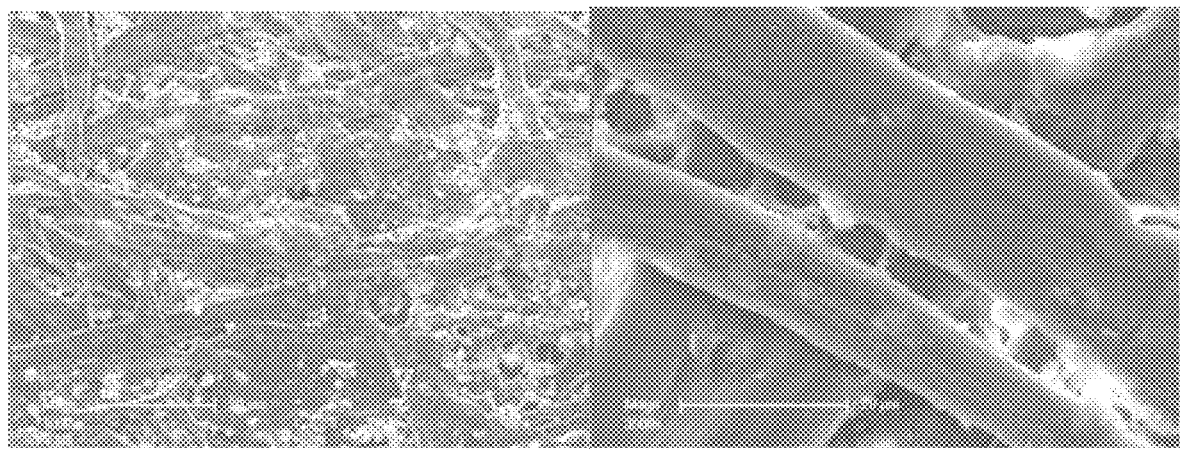
FIG. 16 shows SEM images of the silver nanoparticles once the aqueous gel ink is applied on a cellulosic paper A4 80 $g \cdot m^{-2}$.

FIG. 15 shows TEM images (apparatus: JEOL ARM200) of the silver nanoparticles dispersed in the gel-based matrix of aqueous ink comprising hydroxylamine and FIG. 16 shows SEM images (apparatus: MEB Philips XL30) of the silver nanoparticles once the aqueous gel ink is applied on a cellulosic paper A4 80 g·m$^{-2}$ (INACOPIA Elite) (not visible by SEM). The average particle size of the silver nanoparticles is of 40 μm.

When the obtained aqueous gel ink with variable color was written on the cellulosic paper, the color did not change and remained opaque.

The invention claimed is:

1. A process for preparing in situ an aqueous gel ink with variable color comprising the following steps:
   (i) preparing a gel-based matrix of aqueous ink comprising a reducing agent,
   (ii) adding a solution of metallic salts,
   (iii) adding iron powder to obtain an aqueous gel ink with variable color,
   wherein the steps (ii) and (iii) can be interchanged.

2. The process according to claim 1, wherein the reducing agent is chosen in a group consisting of hydroxylamine, ascorbic acid, and mixture thereof.

3. The process according to claim 1, wherein a concentration of reducing agent in the gel-based matrix of aqueous ink of step (i) ranges from 0.01 to 0.3 mol·L−1.

4. The process according to claim 1, wherein the solution of metallic salts is a solution of gold salts (Au3+), silver salts (Ag+), and mixture thereof.

5. The process according to claim 1, wherein a concentration of metallic salts in the gel-based matrix of aqueous ink of step (ii) ranges from 0.001 to 0.1 mol·L−1.

6. An aqueous gel ink with variable color obtained according to the process of claim 1, comprising a reducing agent, metallic nanoparticles and iron powder.

7. The aqueous gel ink according to claim 6, wherein an amount of reducing agent ranges from 0.05 to 5% by weight relative to a total weight of the aqueous gel ink.

8. The aqueous gel ink according to claim 6, wherein the metallic nanoparticles are chosen in a group consisting of gold nanoparticles, silver nanoparticles, and mixture thereof.

9. The aqueous gel ink according to claim 6, wherein the metallic nanoparticles have an average particle size ranging from 1 to 100 nm.

10. The aqueous gel ink according to claim 6, wherein an amount of metallic nanoparticles ranges from 0.01 to 1% by weight relative to a total weight of the aqueous gel ink.

11. The aqueous gel ink according to claim 6, wherein an amount of iron powder ranges from 0.0001 to 0.04% by weight relative to a total weight of the aqueous gel ink.

12. The aqueous gel ink according to claim 6, wherein an amount of water ranges from 50 to 95% by weight relative to a total weight of the aqueous gel ink.

13. The aqueous gel ink according to claim 6, wherein a distance between the metallic nanoparticles within the aqueous gel ink is lower than 100 nm.

14. The aqueous gel ink according to claim 6, further comprising a solvent chosen in a group consisting of glycol ethers.

15. The aqueous gel ink according to claim 6, further comprising an antimicrobial agent chosen in a group consisting of 1,2-benzisothiazolin-3-one, 2-methyl-4-isothiazolin-3-one, and mixture thereof.

16. The aqueous gel ink according to claim 6, further comprising a corrosion inhibitor chosen in a group consisting of tolytriazole, benzotriazole, and mixture thereof.

17. The aqueous gel ink according to claim 6, further comprising an antifoam agent.

18. The aqueous gel ink according to claim 6, further comprising a rheology modifier chosen in a group consisting of xanthan gum, gum arabic, and mixture thereof.

19. A writing instrument comprising:
   an axial barrel containing an aqueous gel ink with variable color according to claim 6, and
   a pen body which delivers the aqueous gel ink stored in the axial barrel.

* * * * *